Dec. 2, 1947.  H. J. STRETTON  2,432,048
WELDING ELECTRODE
Filed Dec. 10, 1945

Inventor
H. J. Stretton

UNITED STATES PATENT OFFICE 2,432,048

WELDING ELECTRODE

Henry Jackson Stretton, Gateshead-on-Tyne, England, assignor to Fusarc Limited, Gateshead-on-Tyne, England Application December 10, 1945, Serial No. 633,990
In Great Britain December 27, 1944

1 Claim. (Cl. 219—8)

This invention has for its object to provide improved electrodes for use in electrical welding operations, and particularly continuous electrodes adapted to be employed in automatic or semi-automatic welding machines.

In the accompanying sheet of explanatory drawings.

Figure 1:
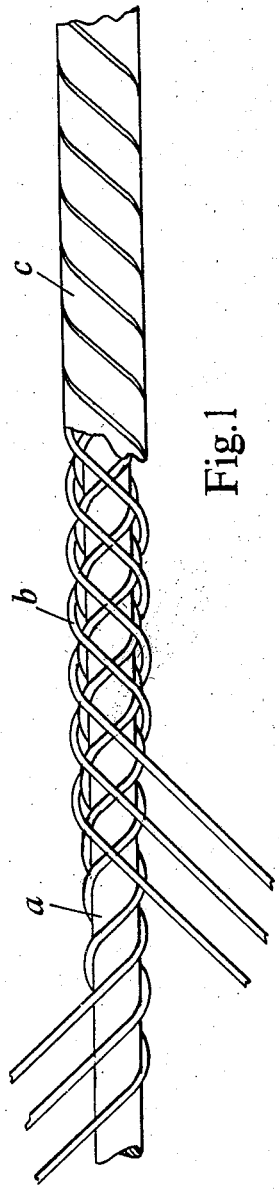
Figure 1 is a side view illustrating a length of electrode constructed in accordance with the invention, a part of the coating being shown broken away, and a part of the sheath being shown in the process of being applied to the core.
Figure 2:
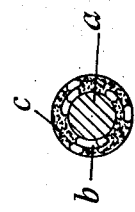
Figure 2 is a cross section of the electrode shown in Figure 1.

In carrying the invention into effect as shown, I employ a wire core $a$ made of mild steel, or any other appropriate ferrous or non-ferrous alloy. Around the core $a$ is wrapped a mesh-like metallic sheath $b$ consisting of wire helices arranged in at least two layers. Each of these layers consists of two or more wires, helically coiled with equal or unequal spaces between the convolutions. Also the layers are wound in opposite directions and preferably so that the wires in the two layers cross each other at about a right angle as shown at the left hand side of Figure 1. Subsequently a coating $c$ of any appropriate flux material is applied, this material consisting of the usual powdered minerals mixed with a binding agent. The coating $c$ is applied by an extrusion or other convenient process and is caused to fill the meshes or spaces between the wires forming the mesh-like sheath $b$, excess coating material being removed sufficiently to expose the outer surfaces of the outer wire layer as shown at the right hand side of Figure 1. If desired, the helically coiled wires forming the mesh-like metallic sheath $b$ may be secured to the core $a$ and to each other by spot or seam welding.

By this invention I am able effectively to incorporate concentrically with the electrode an ample amount of flux material, and at the same time enable the required electrical connection with the core to be effected from the exterior of the electrode through the sheath by means of contact pieces held in slidable contact with the exposed surfaces of the sheath. Moreover, the sheath is electromagnetically non-inductive, and in consequence little or no magnetic effect is set up such as would deflect the welding arc when the electrode is in action. Further the electrode is sufficiently flexible to allow it to be coiled and handled with a minimum of risk of detachment of the flux material.

Having thus described my invention what I claim as new and desire to secure by Letters Patent is:

A welding electrode comprising the combination of a metal core, a mesh-like metallic sheath comprising at least two oppositely coiled wire helices on the core, each layer consisting of at least two helices, and a coating of flux material incorporated with the meshes of the sheath and leaving exposed the outer surface of the outer layer.

HENRY JACKSON STRETTON.

REFERENCES CITED

The following references are of record in the file of this patent:

UNITED STATES PATENTS

| Number | Name | Date |
|---|---|---|
| 1,277,639 | Pescatore | Sept. 3, 1918 |
| 1,517,311 | Motte | Dec. 2, 1924 |
| 1,760,534 | Whiting et al. | May 27, 1930 |
| 1,768,998 | Ross | July 1, 1930 |

FOREIGN PATENTS

| Number | Country | Date |
|---|---|---|
| 415,035 | Great Britain | Aug. 14, 1934 |
| 499,852 | Great Britain | Apr. 26, 1937 |
| 502,823 | Great Britain | Mar. 27, 1939 |
| 789,609 | France | Aug. 19, 1935 |